Patented July 29, 1930

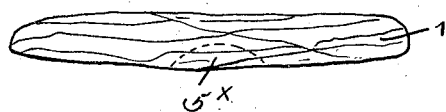
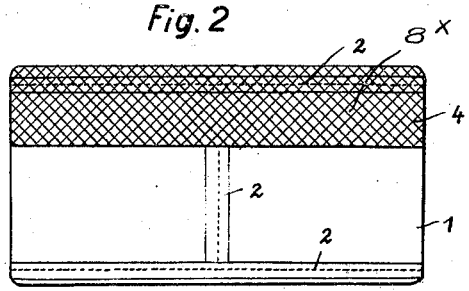
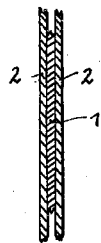
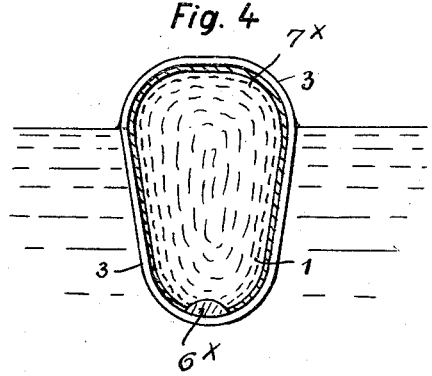

1,771,730

UNITED STATES PATENT OFFICE

RUDOLF MARCKS, OF BERLIN, GERMANY

FLOTATION BAG

Application filed June 20, 1927, Serial No. 200,235. Renewed June 23, 1930.

This invention refers broadly to so-called flotation bags or the like adapted for operation by automatically operated, gas producing substances for the purpose of preventing the foundering and sinking of damaged ships, boats, cases, persons or for maintaining the buoyancy of floating articles, and for similar purposes, and it is intended to increase the safety of operation and to simplify and facilitate the manufacture of devices of the kind referred to, and to serve other important objects in connection therewith. Broadly considered the invention comprises such instrumentalities in which the gas or the buoyancy producing agent is obtained by the action of a sufficiency of water upon an agent contained in the bag or connected thereto, and it is one of the important objects of the invention to so arrange and construct the bag or other flexible container that the joints, seams or points of juncture of the several sections are provided with special tightening means, so that the passage of the water can only take place through the fabric or material of the bag or the like. In connection therewith the bag or the like in a preferred embodiment is provided with a hygroscopic coating or outer layer, for instance of nettle, so as to facilitate the rapid moistening of its entire surface.

It has been found advantageous for various purposes to so construct the bag or container that the portion thereof which in the inflated condition constitutes the top section is made airtight by being impregnated with rubber or the like, while the lower section which is to be immersed and is to contain the chemicals is made of material pervious for the water, such as linen or the like, but so arranged and selected that it will prevent the escape therethrough of the gas evolved. In further pursuance of this and other objects of the invention the submerged portion of the container which is filled with the chemicals is weighted, for instance by pieces of lead or the like.

Provision is also made in connection with the various objects of the invention for charging the bag or the like not only with a gas producing substance, but additionally therewith a past-producing body-composition, such as flour and sugar or the like with a view of rendering the fabric or tissue proof against gas pressure after the evolution of the gas.

The particular tightening of the joints or seams may be preferably effected by the pasting thereupon of rubber strips or of gummed or rubber-impregnated pieces of fabric along the entire extent of the joints or seams. In further pursuance of this feature rubber strips or bands may be pasted upon the seams or joints on both sides of the bag or the like. The entire bag or the like may be made airtight by impregnation with rubber or the like, the charge consisting of liquid or of semi-liquid material.

The invention will be more particularly described by reference to the accompanying drawing, showing by way of illustrative exemplification in Figure 1 a bag according to the invention in the deflated and folded-up condition. Figure 2 is a bag according to the invention in the inflated state. Figure 3 is a detail of construction to be referred to. Figure 4 is a sectional view of a bag with hygroscopic covering in the inflated condition and floating in water.

The bag 1 is made of an elastic flexible material, pervious to water, such as linen or the like. It may either be closed all around by sewing as shown in the drawing, or it may be in the form of an open bag the open end of which after placing therein the gas-producing chemicals, may be tied up or laced. This latter embodiment presents the advantage that the charge of chemicals may be renewed or supplemented without the necessity of destroying the bag itself, after the charge is exhausted. The bag is provided with a small charge of gas producing chemicals 5, adapted to the purpose intended and to the capacity of the bag, and preferably in the powdered or liquid state, such as for instance, powdered citric acid, tartaric acid or the like, or with an acetate, and sodium-bicarbonate. Or the acid may be employed in the diluted and liquid condition, such as for instance dilute hydrochloric acid or acetic acid. In this case the acid should, of course, be contained in a special container, preferably open and adapted to be tilted upon the bag being vibrated or heavily handled.

In the deflated and folded-up condition the bag, as shown in Figure 1, may be easily carried around without constituting an objectionable weight or necessitating space. Upon the immersion of the bag or the like in water, as for instance upon the foundering of a ship or of any conveyance or article by the entering water, a certain amount of water will enter the bag, and this entering liquid will produce a chemical reaction of the chemical substances contained in the bag. Gases are thereby produced which cause the inflation of the bag. The entering water having wetted the entire bag the individual threads or units of the tissue thereof have become enlarged and increase in volume, and they are, moreover forced against each other by the gas pressure produced, in such a manner, as to present a flexible wall impervious to gas.

In order to obviate the entrance of water through the seams or joints or the escape of the gases therethrough, and in order to compel the water to pass exclusively through the homogeneous fabric, special tightening means are provided for the seams or joints. This is effected by pasting upon the seams or joints upon their entire extent bands or strips of rubber or rubber-coated strips or the like on one or both sides of the walls of the bag. The pasting strips are indicated at 2 in Figure 2 of the drawing.

In Figure 3 a section through a bag is shown in which 1 indicates the stitched part of the web of fabric. 2 are the two pasting strips shown in section.

In order to provide for a complete utilization of the buoyancy producing effect of the gas-enveloping chemicals present, it is necessary that the entire bag should be wetted over its entire surface by the water entering the bag and as much as possible simultaneously with the moistening of the chemicals. In order to insure this result it is preferable to provide the bag with a covering of water-aspirating material, or with a hygroscopic covering, as for instance of nettle or the like. In Figure 4 the hygroscopic covering is indicated at 3. The hygroscopic action has likewise been shown in the drawing by the capillary adhesion of the liquid, the water at its point of contact being somewhat raised with relation to the partially immersed bag by the covering of nettle, thus insuring the wetting of the portion of the bag above the water level which is thereby made proof against the gas pressure.

In the case of bags which are only intended for partial immersion in water, such as for instance in the case of ships'-buoys or rescue-rafts and the like in accordance with the system of this invention that part of the bag which in the deflated state is to be on top, is preferably made air-tight by means of impregnation with rubber or the like, while the lower portion which projects into the liquid is made of linen or the like. This feature is indicated in Figure 2 of the drawing, where the upper part 4 of the bag 1 is made air-tight by being impregnated with rubber. In order to insure the stability of the bag in its freely floating condition, it is preferable to arrange a lead weight 6 or the like in the lower portion of the bag.

In order to render the fabric which is intended to constitute the lower bag portion, absolutely proof against pressure, the inner surface of the fabric or tissue may be dusted over or coated in the manufacture of the bag or balloon with a mixture of flour and sugar or with other paste-producing substances. The water entering the bag will form a paste or dough from these paste producing substances, such paste becoming deposited on the inside of the fabric or tissue as indicated roughly at 7 in Figure 4 of the drawing, and coating and covering it air-tight.

For special purposes it is advantageous to make the entire bag air-tight by impregnating it with rubber or the like. The charge should then comprise liquid or semi-liquid materials. As an instance I may mention a charge of sodium-bicarbonate and a weak acid or dilute acid in connection with this modification.

By means of the invention hereinbefore described it has become possible to construct a buoyancy bag or the like which is highly suitable for rescuing purposes and for the prevention of the going down of damaged ships or boats and which presents the important advantages of being easily mounted and carried around or shipped together with low costs of manufacture and high supporting qualities and reliability of operation. The buoyancy or floating bag according to this invention presents moreover the additional advantage in view of its construction that a decrease of pressure is obviated during comparatively very long periods of time; even a small bag of rather low weight retains its supporting capacity for at least 12 hours. Suitably assembled and carefully selected bags or pouches according to this invention and manufactured from correspondingly heavy fabric will retain their carrying and supporting qualities in water during 72 or more hours. To these advantages should be added the important feature that such bags, pouches or the like may be refilled after use with very low expense and may be fitted in condition for re-use. The bags or pouches are adapted for vehicles and vessels of all kinds, and they are particularly suitable in cases where there is lack of space for the storing of rescuing appliances, such as for instance in the case of aeroplanes where the bags may be mounted in the sustaining planes and in the trunk or main body of the machine. The invention may also be applied to the manufacture of rescuing waist-coats or the like, and comprising a single bag or a combination of a plurality of such bags or pouches or floating jackets, belts, trousers or the like may be made from such bags, and various other modifications and kinds of embodiments are possible within the scope and spirit of the invention, and without deviating from the essential features thereof, as expressed in the appended claims.

I claim:—

1. In a collapsible and inflatable, floatable container the combination with an outer flexible, containing bag of fabric and a charge of mutually reacting, gas-liberating and paste forming material within said bag.

2. In a collapsible and inflatable, floatable container the combination with an outer leak-proof flexible bag of fabric of a charge of mutually reacting, gas-liberating material within the bag, and a coating of paste-forming material covering the inner surface of the bag.

3. In a collapsible, and inflatable, floating container, an outer, substantially leak-proof, water-pervious, flexible bag, and a charge of mutually reacting, gas-liberating and paste forming materials housed in said bag, and stabilizing means on said bag.

4. A collapsible and inflatable, floatable container, comprising an outer, enveloping, substantially leak-proof, water-pervious bag of flexible material, stabilizing means at the lower portion of the bag, and a water-proof upper portion on said bag, and a charge of gas-liberating and paste forming materials housed in the interior of said bag.

5. A collapsible and inflatable, floatable container, comprising an outer, enveloping, substantially leak-proof, water-pervious bag of flexible material, a coating of paste-forming material on the inner surface of said bag, and a charge of gas-liberating material enclosed in said bag.

6. A collapsible and inflatable, floatable container, comprising an outer, enveloping, water-pervious and substantially leak-proof bag of flexible material, a charge of gas-liberating material within the bag, and an interior coating of flour-containing and paste-forming material inside of the bag.

7. A collapsible and inflatable, floatable container, comprising an outer, enveloping water-pervious bag of flexible material, a water-absorbing coating at the outside thereof, and an interior coating of paste-forming material at the inner surface thereof, and a charge of gas forming material within the bag.

8. A collapsible and inflatable, floatable container, comprising an outer, enveloping, water-pervious bag of flexible material, stabilizing means at the lower part of said bag, and a water-proof upper portion on said bag, a water-absorbing outer coating of nettle on said bag outside of the water-proof portion, and a charge of gas-developing and paste-forming material in the interior of the said bag.

RUDOLF MARCKS.